United States Patent
Hayashi

(10) Patent No.: US 11,784,586 B2
(45) Date of Patent: Oct. 10, 2023

(54) POWER CONVERSION DEVICE

(71) Applicant: TOSHIBA MITSUBISHI-ELECTRIC INDUSTRIAL SYSTEMS CORPORATION, Chuo-ku (JP)

(72) Inventor: Yousuke Hayashi, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 113 days.

(21) Appl. No.: 17/608,854

(22) PCT Filed: Mar. 31, 2020

(86) PCT No.: PCT/JP2020/014887
§ 371 (c)(1),
(2) Date: Nov. 4, 2021

(87) PCT Pub. No.: WO2021/199312
PCT Pub. Date: Oct. 7, 2021

(65) Prior Publication Data
US 2022/0311356 A1    Sep. 29, 2022

(51) Int. Cl.
*H02M 1/14* (2006.01)
*H02M 7/5395* (2006.01)

(52) U.S. Cl.
CPC ......... *H02M 7/5395* (2013.01); *H02M 1/143* (2013.01)

(58) Field of Classification Search
CPC ............ H02M 7/42; H02M 7/44; H02M 7/48; H02M 7/4803; H02M 7/487; H02M 7/53;

(Continued)

(56) References Cited

U.S. PATENT DOCUMENTS

| | | | | |
|---|---|---|---|---|
| 5,450,306 A | * | 9/1995 | Garces | .................. H02M 5/458 363/58 |
| 2005/0281067 A1 | * | 12/2005 | Deng | ................ H02M 7/53875 363/131 |
| 2017/0131340 A1 | * | 5/2017 | Tallam | ...................... B60L 3/04 |

FOREIGN PATENT DOCUMENTS

| | | |
|---|---|---|
| JP | 2018-207785 A | 12/2018 |
| JP | 2019-154181 A | 9/2019 |

OTHER PUBLICATIONS

International Search Report dated Jun. 9, 2020 in PCT/JP2020/014887 filed on Mar. 31, 2020, 2 pages.

(Continued)

*Primary Examiner* — Gary L Laxton
(74) *Attorney, Agent, or Firm* — Oblon, McClelland, Maier & Neustadt, L.L.P.

(57) ABSTRACT

In this power conversion device, first three-phase AC voltages generated by an inverter and an AC filter are divided by first to third voltage dividers to generate second three-phase AC voltages, and third three-phase AC voltages that are line-to-line voltages of the second three-phase AC voltages and a neutral point voltage of the first three-phase AC voltages are detected. Then, DC components of the third three-phase AC voltages resulting from errors of voltage ratios of the first to third voltage dividers are obtained based on the detection results and contents in a storage unit, the DC components are removed from the third three-phase AC voltages to generate fourth three-phase AC voltages, and the inverter is controlled such that DC components of the fourth three-phase AC voltages are eliminated.

8 Claims, 9 Drawing Sheets

(58) Field of Classification Search
CPC .............. H02M 7/537; H02M 7/5387; H02M 7/53871; H02M 7/539; H02M 7/5395; H02M 1/14; H02M 1/143
See application file for complete search history.

(56) References Cited

OTHER PUBLICATIONS

Indian Office Action dated Nov. 3, 2022 in Indian Patent Application No. 202117052620, 5 pages.

* cited by examiner

POWER CONVERSION DEVICE

TECHNICAL FIELD

The present invention relates to a power conversion device and more particularly to a power conversion device including a reverse converter that converts DC voltage into three-phase AC voltage.

BACKGROUND ART

For example, Patent Literature 1 discloses a power conversion device including a reverse converter that converts DC voltage into AC voltage, a transformer that transmits AC output voltage from the reverse converter to a load, and a control device that controls the reverse converter such that a DC component of the AC output voltage is eliminated, thereby preventing occurrence of an asymmetrical excitation phenomenon in the transformer.

CITATION LIST

Patent Literature

PTL 1: Japanese Patent Laying-Open No. 2018-207785

SUMMARY OF INVENTION

Technical Problem

In general, in such a power conversion device, a first AC voltage output from the reverse converter is divided to generate a second AC voltage, and the reverse converter is controlled such that a DC component of the second AC voltage is eliminated. When first three-phase AC voltages are generated by the reverse converter, the first three-phase AC voltages are divided by first to third voltage dividers to generate second three-phase AC voltages, and the reverse converter is controlled such that DC components of third three-phase AC voltages that are the line-to-line voltages of the second three-phase AC voltages are eliminated.

However, when the voltage division ratios of the first to third voltage dividers are not identical, DC components resulting from errors of voltage ratios of the first to third voltage dividers are included in the third three-phase AC voltages, so that the reverse converter is unable to be controlled accurately.

A main object of the present invention is therefore to provide a power conversion device capable of accurately controlling the reverse converter even when the voltage ratios of the first to third voltage dividers are not identical.

Solution to Problem

A power conversion device according to the present invention includes a reverse converter, first to third voltage dividers, first to third voltage detectors, a fourth voltage detector, a storage unit, a correction unit, and a control unit. The reverse converter converts DC voltage into first three-phase AC voltages. The first to third voltage dividers divide the first three-phase AC voltages to generate second three-phase AC voltages. The first to third voltage detectors detect third three-phase AC voltages that are line-to-line voltages of the second three-phase AC voltages. The fourth voltage detector detects a neutral point voltage of the first three-phase AC voltages. The storage unit stores information related to errors of voltage division ratios of the first to third voltage dividers. The correction unit obtains DC components resulting from the errors of voltage division ratios in the third three-phase AC voltages, based on detection results of the first to fourth voltage detectors and contents in the storage unit. The correction unit removes the obtained DC components from the third three-phase AC voltages to generate fourth three-phase AC voltages. The control unit controls the reverse converter such that DC components of the fourth three-phase AC voltages are eliminated.

Advantageous Effects of Invention

In this power conversion device, the first three-phase AC voltages output from the reverse converter are divided by the first to third voltage dividers to generate the second three-phase AC voltages, and the third three-phase AC voltages that are line-to-line voltages of the second three-phase AC voltages and the neutral point voltage of the first three-phase AC voltages are detected. Then, DC components resulting from errors of voltage ratios in the third three-phase AC voltages are obtained based on the detection results and contents in the storage unit, the DC components are removed from the third three-phase AC voltages to generate the fourth three-phase AC voltages, and the reverse converter is controlled such that DC components of the fourth three-phase AC voltages are eliminated. The reverse converter therefore can be controlled accurately even when the voltage division ratios of the first to third voltage dividers are not identical.

DESCRIPTION OF EMBODIMENTS

First Embodiment

Figure 1:
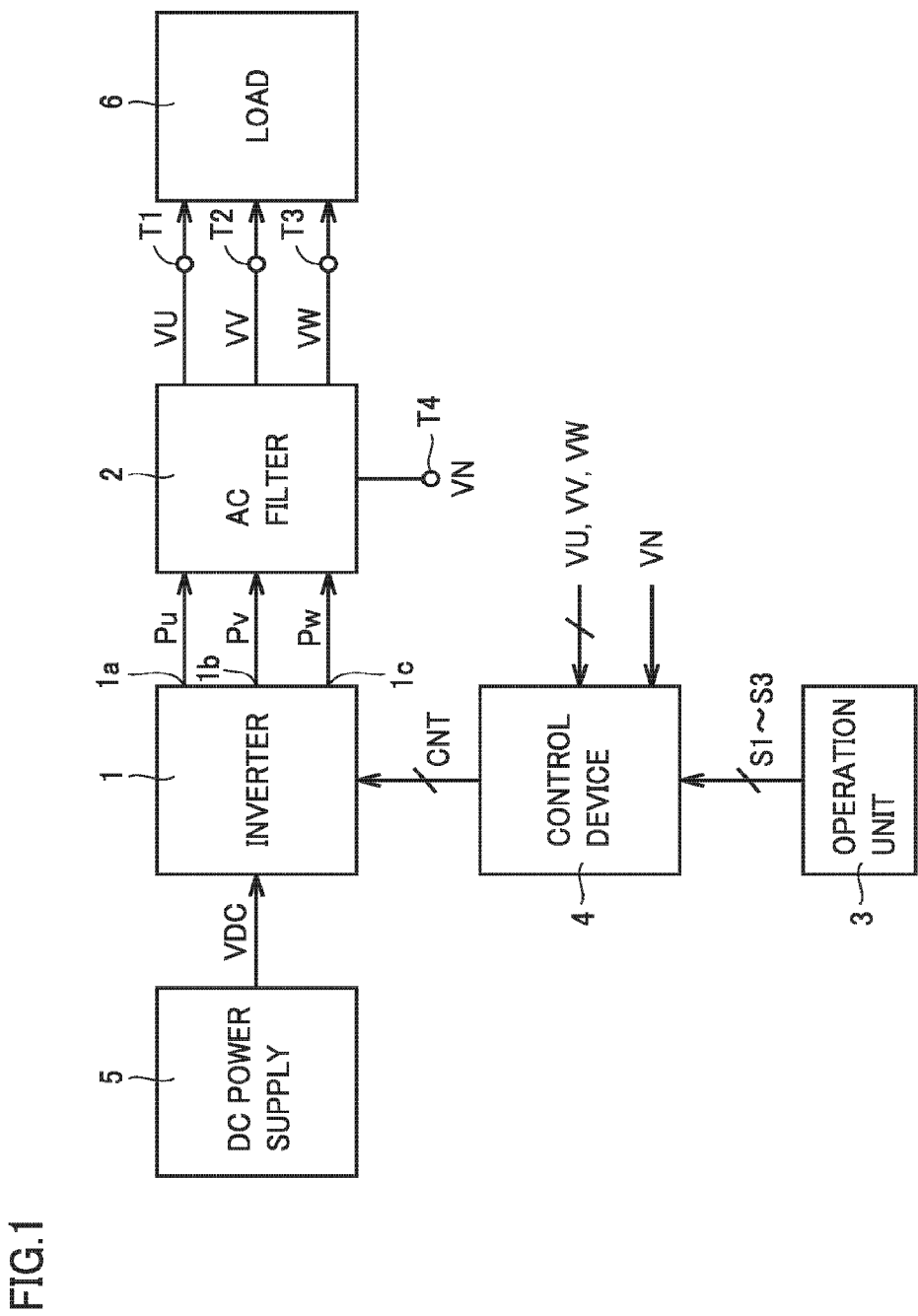
FIG. 1 is a block diagram showing a configuration of a power conversion device according to a first embodiment.

FIG. 1 is a block diagram showing a configuration of a power conversion device according to a first embodiment. In FIG. 1, this power conversion device includes an inverter 1, an AC filter 2, an operation unit 3, a control device 4, and output terminals T1 to T3.

Inverter 1 is controlled by a control signal CNT supplied from control device 4. Inverter 1 includes, for example, six IGBTs (Insulated Gate Bipolar Transistors) and six diodes respectively connected in anti-parallel with the six IGBTs.

Control signal CNT includes six gate signals for respectively turning on and off the six IGBTs. Each of the six gate signals is a PWM (Pulse Width Modulation) signal.

Inverter 1 converts a DC voltage VDC supplied from a DC power supply 5 into three-phase pulse signal trains Pu, Pv, and Pw having a commercial frequency, which are output to output nodes 1a, 1b, and 1c. DC power supply 5 may be a battery or may be a forward converter that converts AC voltage supplied from a commercial AC power supply into DC voltage.

Figure 2:
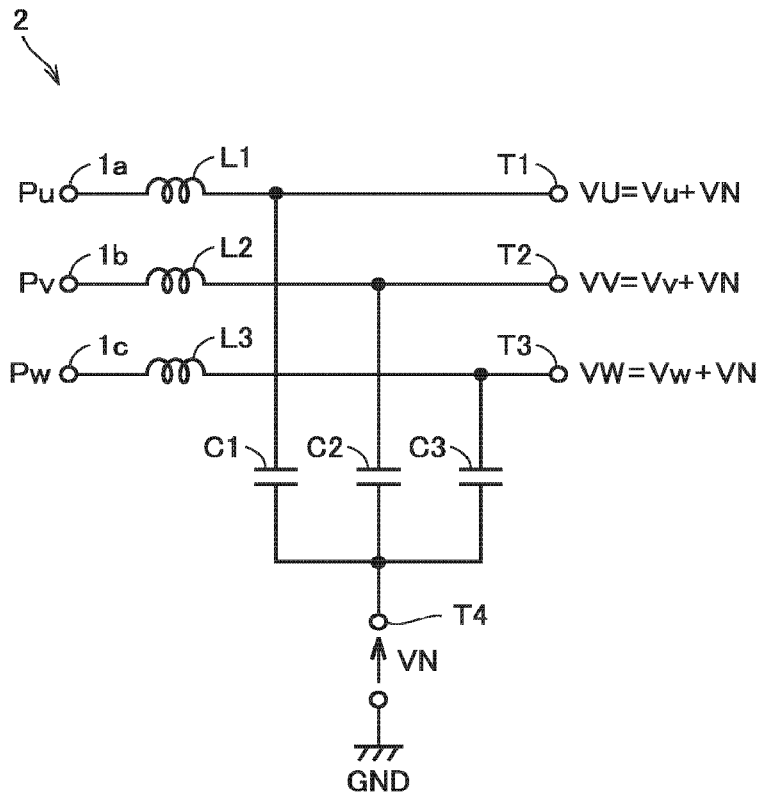
FIG. 2 is a circuit diagram showing a configuration of an AC filter shown in FIG. 1.

FIG. 2 is a circuit diagram showing a configuration of AC filter 2. In FIG. 2, AC filter 2 includes reactors L1 to L3 and capacitors C1 to C3. Reactors L1 to L3 have first terminals respectively connected to output nodes 1a to 1c of inverter 1 and second terminals respectively connected to output terminals T1 to T3. Capacitors C1 to C3 have first electrodes respectively connected to output terminals T1 to T3 and second electrodes connected commonly to a neutral point terminal T4.

A neutral point voltage VN is produced between neutral point terminal T4 and a line of ground voltage GND (reference voltage). Neutral point voltage VN is DC voltage and fluctuates with the environment in which the power conversion device is installed. Neutral point voltage VN is detected by control device 4.

AC filter 2 is a low pass filter, passes AC components having a commercial frequency of three-phase pulse signal trains Pu, Pv, and Pw output from inverter 1, and cuts off a signal having a switching frequency. In other words, AC filter 2 converts three-phase pulse signal trains Pu, Pv, and Pw into three-phase AC voltages VU, VV, and VW (first three-phase AC voltages) having a commercial frequency.

Three-phase AC voltages VU, VV, and VW include AC voltages Vu, Vv, and Vw, respectively, and neutral point voltage VN. That is, VU=Vu+VN, VV=Vv+VN, and VW=Vw+VN. Each of AC voltages Vu, Vv, and Vw changes sinusoidally with a commercial frequency. AC voltages Vu, Vv, and Vw are out of phase by 120 degrees. Instantaneous values of three-phase AC voltages VU, VV, and VW are detected by control device 4.

Figure 3:
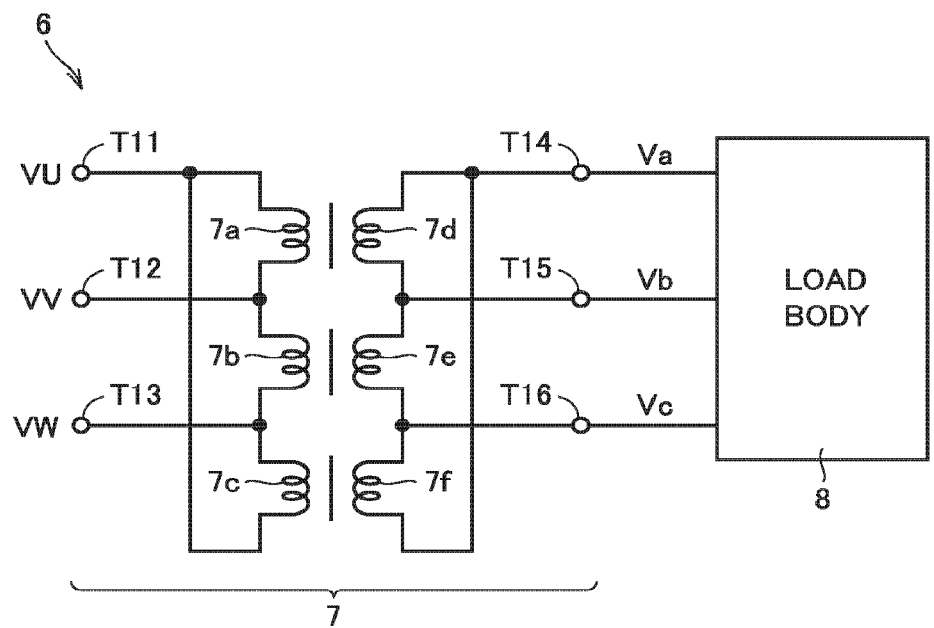
FIG. 3 is a circuit block diagram illustrating a configuration of a load shown in FIG. 1.

Returning to FIG. 1, load 6 is connected to output terminals T1 to T3. Load 6 is driven by three-phase AC voltages VU, VV, and VW supplied from the power conversion device. FIG. 3 is a circuit block diagram illustrating a configuration of load 6. In FIG. 3, load 6 includes a three-phase transformer 7 and a load body 8.

Three-phase transformer 7 may be of any of delta-delta type, delta-star type, star-delta type, and star-star type. FIG. 3 shows three-phase transformer 7 of delta-delta type.

Three-phase transformer 7 includes primary terminals T11 to T13, secondary terminals T14 to T16, primary windings 7a to 7c, and secondary windings 7d to 7f. Primary terminals T11 to T13 respectively receive three-phase AC voltage VU, VV, and VW passing through AC filter 2. Secondary terminals T14 to T16 are connected to load body 8.

Primary windings 7a to 7c have first terminals respectively connected to primary terminals T11, T12, and T143 and have second terminals respectively connected to primary terminals T12, T13, and T11. Secondary windings 7d to 7f have first terminals respectively connected to secondary terminals T14, T15, and T16 and have second terminals respectively connected to secondary terminals T15, T16, and T14.

Three-phase AC voltages Va, Vb, and Vc having a level corresponding to AC components Vu, Vv, and Vw of three-phase AC voltages VU, VV, and VW are output to secondary terminals T14 to T16. Load body 8 is driven by three-phase AC voltages Va to Vc supplied from three-phase transformer 7.

When three-phase AC voltages VU, VV, and VW are applied to primary windings 7a to 7c of three-phase transformer 7 and current flows through windings 7a to 7f, a magnetic flux is generated in the core (not shown). Generation of a DC component in the magnetic flux in the core is referred to as asymmetrical excitation. When asymmetrical excitation occurs, exciting current of three-phase transformer 7 increases, and the waveforms of three-phase AC voltages VU, VV, and VW may be deteriorated, or overcurrent may flow through three-phase transformer 7 to cause breakage of the power converter. In such a power conversion device, therefore, it is necessary to prevent occurrence of an asymmetrical excitation phenomenon in three-phase transformer 7.

Returning to FIG. 1, operation unit 3 includes a plurality of switches and a plurality of buttons operated by the user of the power conversion device, and an image display unit presenting a variety of information. The user of the power conversion device can operate operation unit 3 to power on and off the power conversion device or select one of an error detection mode and an operation mode.

Operation unit 3 outputs an error detection signal S1 when giving an instruction to perform an error detection mode, outputs an operation command signal S2 when giving an instruction to operate load 6, and outputs an operation stop signal S3 when giving an instruction to stop the operation of load 6. Control device 4 generates and applies control signal CNT to inverter 1, based on signals S1 to S3 from operation unit 3, three-phase AC voltages VU, VV, and VW, neutral point voltage VN, and the like. The error detection mode will be described later.

Figure 4:
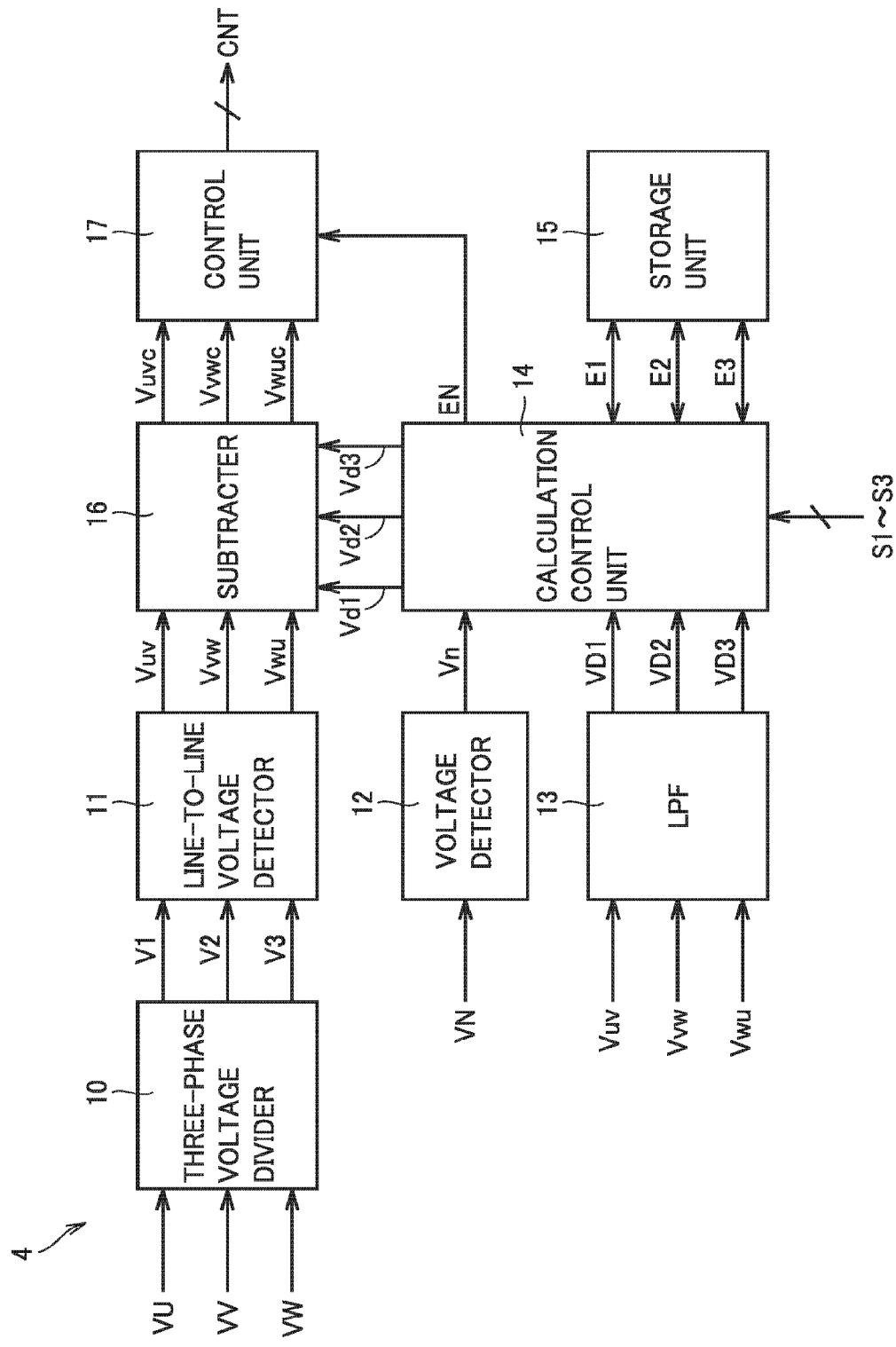
FIG. 4 is a block diagram showing a configuration of a control device shown in FIG. 1.

FIG. 4 is a block diagram showing a configuration of control device 4. In FIG. 4, control device 4 includes a three-phase voltage divider 10, a line-to-line voltage detector 11, a voltage detector 12, a LPF (Low Pass Filter) 13, a calculation control unit 14, a storage unit 15, a subtracter 16, and a control unit 17.

Three-phase voltage divider 10 divides three-phase AC voltages VU, VV, and VW output to output terminals T1 to T3 (FIG. 1) to generate three-phase AC voltages V1 to V3 (second three-phase AC voltages). Line-to-line voltage detector 11 detects line-to-line voltages V12=V1−V2, V23=V2−V3, and V31=V3−V1 of three-phase AC voltages V1 to V3 and outputs three-phase AC signals Vuv, Vvw, and Vwu indicating the detected values of line-to-line voltages V12, V23, and V31 (third three-phase AC voltages).

Figure 5:
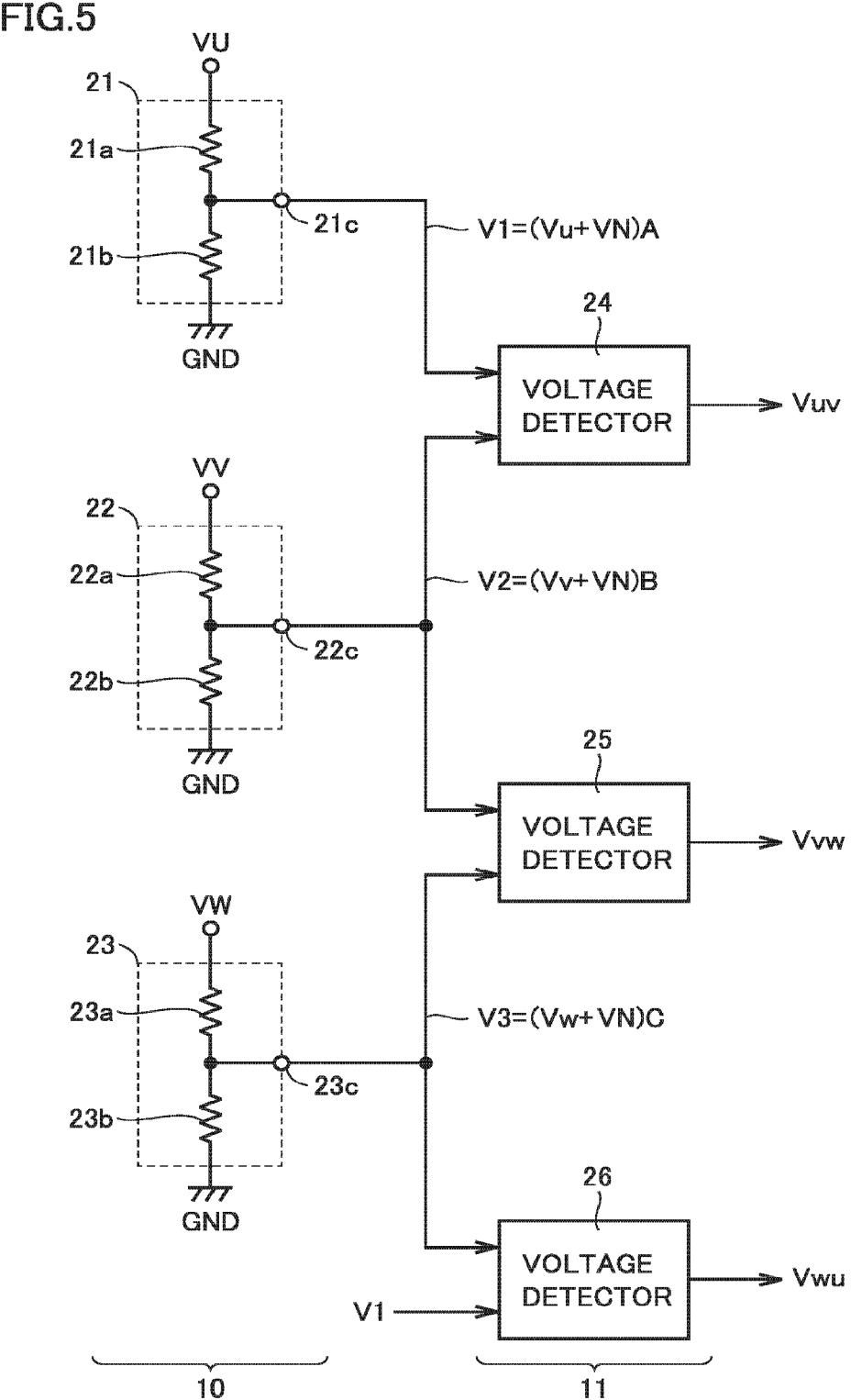
FIG. 5 is a circuit block diagram showing a configuration of three-phase voltage dividers and line-to-line voltage detectors shown in FIG. 4.

FIG. 5 is a circuit block diagram showing a configuration of three-phase voltage divider 10 and line-to-line voltage detector 11. In FIG. 5, three-phase voltage divider 10 includes voltage dividers 21 to 23. Voltage divider 21 includes resistor elements 21a and 21b and a monitor terminal 21c. Resistor element 21a has a first terminal receiving AC voltage VU=Vu+VN and a second terminal connected to monitor terminal 21c. Resistor element 21b has a first terminal connected to monitor terminal 21c and a second terminal receiving ground voltage GND (reference voltage). Letting the resistances of resistor elements 21a and 21b be R1 and R2, respectively, the voltage division ratio A of voltage divider 21 is A=R2/(R1+R2). In other words, AC voltage V1=(Vu+VN)A is output to monitor terminal 21c.

Voltage divider 22 includes resistor elements 22a and 22b and a monitor terminal 22c. Resistor element 22a has a first terminal receiving AC voltage VV=Vv+VN and a second terminal connected to monitor terminal 22c. Resistor element 22b has a first terminal connected to monitor terminal 22c and a second terminal receiving ground voltage GND. Letting the resistances of resistor elements 22a and 22b be R3 and R4, respectively, the voltage division ratio B of voltage divider 22 is B=R4/(R3+R4). AC voltage V2=(Vv+VN)B is output to monitor terminal 22c.

Voltage divider 23 includes resistor elements 23a and 23b and a monitor terminal 23c. Resistor element 23a has a first terminal receiving AC voltage VW=Vw+VN and a second terminal connected to monitor terminal 23c. Resistor element 23b has a first terminal connected to monitor terminal 23c and a second terminal receiving ground voltage GND. Letting the resistances of resistor elements 23a and 23b be R5 and R6, respectively, the voltage division ratio C of voltage divider 23 is C=R6/(R5+R6). AC voltage V3=(Vw+VN)C is output to monitor terminal 23c.

Line-to-line voltage detector 11 includes voltage detectors 24 to 26. Voltage detector 24 detects a voltage V12=V1−V2=VuA−VvB+VN(A−B) that is the difference between AC output voltage V1=(Vu+VN)A of voltage divider 21 and AC output voltage V2=(Vv+VN)B of voltage divider 22 and outputs an AC signal Vuv indicating the detected line-to-line voltage V12.

Voltage detector 25 detects a voltage V23=V2−V3=VvB−VwC+VN(B−C) that is the difference between AC output voltage V2=(Vv+VN)B of voltage divider 22 and AC output voltage V3=(Vw+VN)C of voltage divider 23 and outputs an AC signal Vvw indicating the detected line-to-line voltage V23.

Voltage detector 26 detects a voltage V31=V3−V1=VwC−VuA+VN(C−A) that is the difference between output voltage V3=(Vw+VN)C of voltage divider 23 and output voltage V1=(Vu+VN)A of voltage divider 21 and outputs an AC signal Vwu indicating the detected line-to-line voltage V31.

In actuality, the voltages of three-phase AC signals Vuv, Vvw, and Vwu are smaller than line-to-line voltages V12, V23, and V31. However, here it is assumed that the voltages of three-phase AC signals Vuv, Vvw, and Vwu are identical to line-to-line voltages V12, V23, and V31 for the sake of brevity of explanation.

The reason for detecting line-to-line voltages V12, V23, and V31 is to facilitate control of inverter 1 by removing neutral point voltage VN. Here, when the voltage division ratios A, B, and C of voltage dividers 21, 22, and 23 are identical, all of DC components VN(A−B), VN(B−C), VN(C−A) of line-to-line voltages V12, V23, and V31 are zero, and V12=(Vu−Vv)A, V21=(Vv−Vw)A, V31=(Vw−Vu)A, and each of V12, V23, and V31 only includes an AC component.

However, in actuality, the voltage division ratios A, B, and C of voltage dividers 21, 22, and 23 do not agree because of manufacturing variations of resistor elements 21a, 21b, 22a, 22b, 23a, and 23b, and errors E1=A−B, E2=B−C, and E3=C−A occur in voltage division ratios A, B, and C.

Line-to-line voltages V12, V23, and V31 therefore have DC components VN×E1, VN×E2, and VN×E3 resulting from errors E1, E2, and E3 of voltage division ratios A, B, and C. If inverter 1 is controlled based on such line-to-line voltages V12, V23, and V31 (that is, AC signals Vuv, Vvw, and Vwu), inverter 1 fails to be controlled accurately, and occurrence of an asymmetrical excitation phenomenon in the three-phase transformer fails to be prevented.

In the present first embodiment, errors E1, E2, and E3 of voltage division ratios A, B, and C are detected and stored, DC components VN×E1, VN×E2, and VN×E3 are obtained by multiplying the stored errors E1 to E3 by neutral point voltage VN, and line-to-line voltages V12, V23, and V31 (that is, AC signals Vuv, Vvw, and Vwu) are corrected based on these DC components VN×E1, VN×E2, and VN×E3.

Returning to FIG. 4, voltage detector 12 detects neutral point voltage VN and outputs a DC signal Vn indicating the detected value. LPF 13 (DC detector) extracts DC components VD1 to VD3 from three-phase AC signals Vuv, Vvw, and Vwu output from voltage detectors 24 to 26 and applies the extracted DC components VD1 to VD3 to calculation control unit 14.

In the error detection mode in which errors E1, E2, and E3 of voltage division ratios A, B, and C are detected, the user of the power conversion device does not connect load 6 to output terminals T1 to T3 (FIG. 1) but performs tuning such that neutral point voltage VN is raised, and operates operation unit 3 (FIG. 1) to apply error detection signal S1 to calculation control unit 14. As an example of the method of performing tuning such that neutral point voltage VN is raised, a resistor having a high resistance (for example 10 kn) is connected between neutral point terminal T4 (FIG. 2) and the line of ground voltage GND.

In this case, in the DC components of line-to-line voltages V12, V23, and V31, DC components VN×E1, VN×E2, and VN×E3 resulting from errors E1, E2, and E3 of voltage division ratios A, B, and C are dominant. As described above, since three-phase AC signals Vuv, Vvw, and Vwu are the same voltages as line-to-line voltages V12, V23, and V31, DC components VD1 to VD3 of three-phase AC signals Vuv, Vvw, and Vwu can be regarded as DC components VN×E1, VN×E2, and VN×E3 resulting from errors E1, E2, and E3 of voltage division ratios A, B, and C.

In response to error detection signal S1, calculation control unit 14 brings signal EN to "H" level that is the active level, and activates control unit 17 to operate inverter 1. Calculation control unit 14 also obtains errors E1=VD1/VN, E2=VD2/VN, and E3=VD3/VN, based on neutral point voltage VN indicated by output signal Vn from voltage detector 12 and DC voltages VD1 to VD3 from LPF 13, and stores the obtained errors E1, E2, and E3 into storage unit 15. After storing errors E1 to E3 into storage unit 15, calculation control unit 14 brings signal EN to "L" level that is the inactive level, and inactivates control unit 17 to stop the operation of inverter 1.

In the operation mode in which load 6 is operated, the user of the power conversion device connects load 6 to output terminals T1 to T3 (FIG. 1), grounds neutral point terminal T4 by a usual method, and operates operation unit 3 (FIG. 1) to apply operation command signal S2 to calculation control unit 14. Grounding neutral point terminal T4 by a usual method is equivalent to connecting a resistor having a low resistance between neutral point terminal T4 and the line of ground voltage GND.

In response to operation command signal S2, calculation control unit 14 brings signal EN to "H" level that is the active level, and activates control unit 17 to operate inverter 1. Calculation control unit 14 also obtains DC voltages VD1=VN×E1, VD2=VN×E2, and VD3=VN×E3 resulting from errors E1, E2, and E3, based on neutral point voltage VN indicated by output signal Vn from voltage detector 12 and errors E1, E2, and E3 stored in storage unit 15, and applies DC signals Vd1 to Vd3 indicating these DC voltages VD1 to VD3 to subtracter 16.

In actuality, the voltages of DC signals Vd1 to Vd3 are smaller than DC voltages VD1 to VD3, but here it is assumed that the voltages of DC signals Vd1 to Vd3 are equal to DC voltages VD1 to VD3 for the sake of brevity of explanation. In the error detection mode, DC signals Vd1 to Vd3 are set to 0 V.

When the operation of load 6 is to be stopped, the user of the power conversion device operates operation unit 3 (FIG. 1) to apply operation stop signal S3 to calculation control unit 14. In response to operation stop signal S3, calculation control unit 14 brings signal EN to "L" level that is the inactive level, and inactivates control unit 17 to stop the operation of inverter 1.

Subtracter 16 subtracts DC signals Vd1 to Vd3 applied from calculation control unit 14 from three-phase AC signals Vuv, Vvw, and Vwu applied from line-to-line voltage detector 11 to generate three-phase AC signals Vuvc=Vuv−Vd1, Vvwc=Vvw−Vd2, and Vwuc=Vwu−Vd3. Calculation control unit 14 and subtracter 16 constitute a correction unit that corrects three-phase AC signals Vuv, Vvw, and Vwu to generate three-phase AC signals Vuvc, Vvwc, and Vwuc (fourth three-phase AC voltages).

Control unit 17 is activated when signal EN is "H" level that is the active level, and generates and applies control signal CNT to inverter 1 such that the DC components remaining in three-phase AC signals Vuvc, Vvwc, and Vwuc applied from subtracter 16 are eliminated. When signal EN is at "L" level that is the inactive level, control unit 17 is inactivated to stop generation of control signal CNT and stop the operation of inverter 1.

Figure 6:
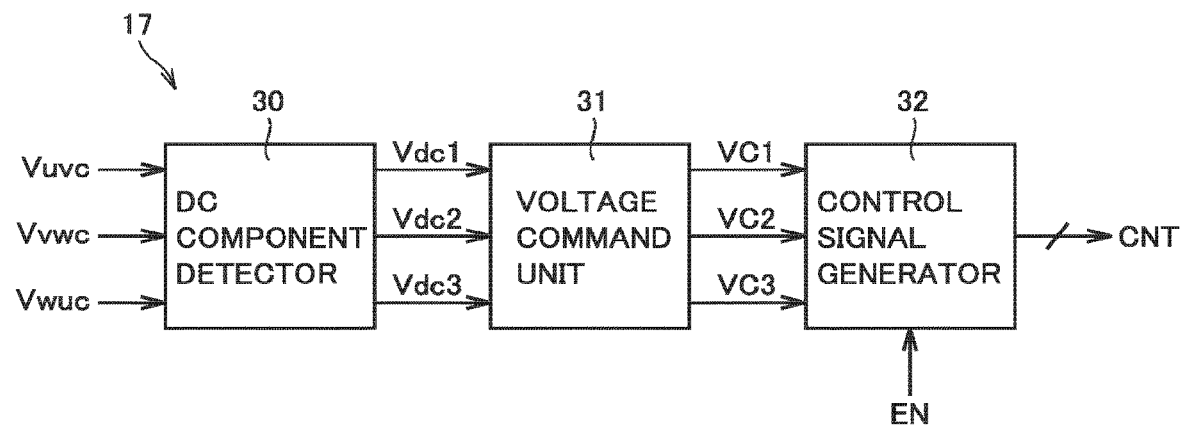
FIG. 6 is a block diagram showing a configuration of a control unit shown in FIG. 5.

FIG. 6 is a block diagram showing a configuration of control unit 17. In FIG. 6, control unit 17 includes a DC component detector 30, a voltage command unit 31, and a control signal generator 32. DC component detector 30 detects each of DC components Vdc1, Vdc2, and Vdc3 of three-phase AC signals Vuvc, Vvwc, and Vwuc applied from subtracter 16 (FIG. 5).

Voltage command unit 31 generates three-phase voltage command signals VC1, VC2, and VC3. Each of voltage command signals VC1 to VC3 is sinusoidal.

Voltage command signals VC1 to VC3 are out of phase by 120 degrees. Voltage command unit 31 controls the waveforms of voltage command signals VC1, VC2, and VC3 such that DC components Vdc1, Vdc2, and Vdc3 are eliminated, respectively.

Control signal generator 32 is activated when signal EN is "H" level that is the active level, and compares the levels of voltage command signals VC1 to VC3 with the level of a triangular wave signal, generates a plurality of (for example, six) PWM signals based on the comparison result, and outputs these PWM signals as control signal CNT to inverter 1. When signal EN is at "L" level that is the inactive level, control signal generator 32 is inactivated to stop generation of control signal CNT and stops the operation of inverter 1.

The use method and the operation of this power conversion device will now be described. In this power conversion device, first of all, the error detection mode is performed, in which errors E1=A−B, E2=B−C, and E3=C−A of voltage division ratios A to C of voltage dividers 21 to 23 (FIG. 5) are detected and stored into storage unit 15 (FIG. 4).

The user of the power conversion device does not connect load 6 to output terminals T1 to T3 (FIG. 1) but performs tuning such that neutral point voltage VN is raised, and operates operation unit 3 to apply error detection signal S1 to calculation control unit 14 and allow control unit 17 to operate inverter 1.

DC voltage VDC supplied from DC power supply 5 is converted into three-phase AC voltages VU=Vu+VN, VV=Vv+VN, and VW=Vw+VN by inverter 1 and AC filter 2. Three-phase AC voltages VU, VV, and VW are divided by voltage dividers 21 to 23 (FIG. 5).

Line-to-line voltages V12=V1−V2, V23=V2−V3, and V31=V3−V1 of three-phase AC voltages V1=(Vu+VN)A, V2=(Vv+VN)B, and V3=(Vw+VN)C generated by voltage dividers 21 to 23 are detected by voltage detectors 24 to 26, and three-phase AC signals Vuv, Vvw, and Vwu indicating line-to-line voltages V12, V23, and V31 are generated. Three phase AC signals Vuv, Vvw, and Vwu are Vuv=VuA−VvB+VN×E1, Vvw=VvB−VwC+VN×E2, and Vwu=VwC−VuA+VN×E3, respectively.

DC components VD1=VN×E1, VD2=VN×E2, and VD3=VN×E3 of three-phase AC signals Vuv, Vvw, and Vwu are extracted by LPF 13 and applied to calculation control unit 14. Neutral point voltage VN is detected by voltage detector 12, and signal Vn indicating neutral point voltage VN is applied to calculation control unit 14.

Calculation control unit 14 obtains errors E1 to E3 of voltage division ratios A to C by dividing DC components VD1 to VD3 by neutral point voltage VN and stores the obtained errors E1 to E3 into storage unit 15 (FIG. 4). This enables the operation of load 6.

When load 6 is to be operated, the user of the power conversion device connects load 6 to output terminals T1 to T3 (FIG. 1), grounds neutral point terminal T4 by a usual method, and operates operation unit 3 (FIG. 1) to apply operation command signal S2 to calculation control unit 14 and allow control unit 17 to operate inverter 1.

DC voltage VDC supplied from DC power supply 5 is converted by inverter 1 and AC filter 2 into three-phase AC voltages VU=Vu+VN, VV=Vv+VN, and VW=Vw+VN, which are supplied to load 6 to operate load 6. Three-phase AC voltages VU, VV, and VW are divided by voltage dividers 21 to 23 (FIG. 5).

Line-to-line voltages V12=V1−V2, V23=V2−V3, and V31=V3−V1 of three-phase AC voltages V1=(Vu+VN)A, V2=(Vv+VN)B, and V3=(Vw+VN)C generated by voltage dividers 21 to 23 are detected by voltage detectors 24 to 26, and three-phase AC signals Vuv, Vvw, and Vwu indicating line-to-line voltages V12, V23, and V31 are generated.

Neutral point voltage VN is detected by voltage detector 12, and signal Vn indicating neutral point voltage VN is applied to calculation control unit 14. Calculation control unit 14 multiplies errors E1 to E3 of voltage division ratios A to C stored in storage unit 15 (FIG. 4) by neutral point voltage VN to obtain DC voltages VD1 to VD3 (that is, DC signals Vd1 to Vd3) resulting from errors E1 to E3 of voltage division ratios A to C.

DC signals Vd1 to Vd3 applied from calculation control unit 14 are subtracted by subtractor 16 from three-phase AC signals Vuv, Vvw, and Vwu applied from line-to-line voltage detector 11, and three-phase AC signals Vuvc, Vvwc, and Vwuc are generated. Control unit 17 generates and applies control signal CNT to inverter 1 such that the DC components remaining in three-phase AC signals Vuvc, Vvwc, and Vwuc applied from subtracter 16 are eliminated, thereby preventing occurrence of an asymmetrical excitation phenomenon in three-phase transformer 7.

When the operation of load 6 is to be stopped, the user of the power conversion device operates operation unit 3 (FIG. 1) to apply operation stop signal S3 to calculation control unit 14 to inactivate control unit 17, thereby stopping the operation of inverter 1.

As described above, in this first embodiment, errors E1 to E3 of voltage division ratios A to C of voltage dividers 21 to 23 are stored in storage unit 15, DC components Vd1 to Vd3 resulting from errors E1 to E3 are obtained by multiplying errors E1 to E3 by neutral point voltage VN, three-phase AC signals Vuvc, Vvwc, and Vwuc are generated by removing DC components Vd1 to Vd3 from three-phase AC signals Vuv, Vvw, and Vwu, and inverter 1 is controlled such that the DC components of three-phase AC signals Vuvc, Vvwc, and Vwuc are eliminated. Inverter 1 therefore can be controlled accurately even when voltage division ratios A to C of voltage dividers 21 to 23 are not identical.

Figure 7:
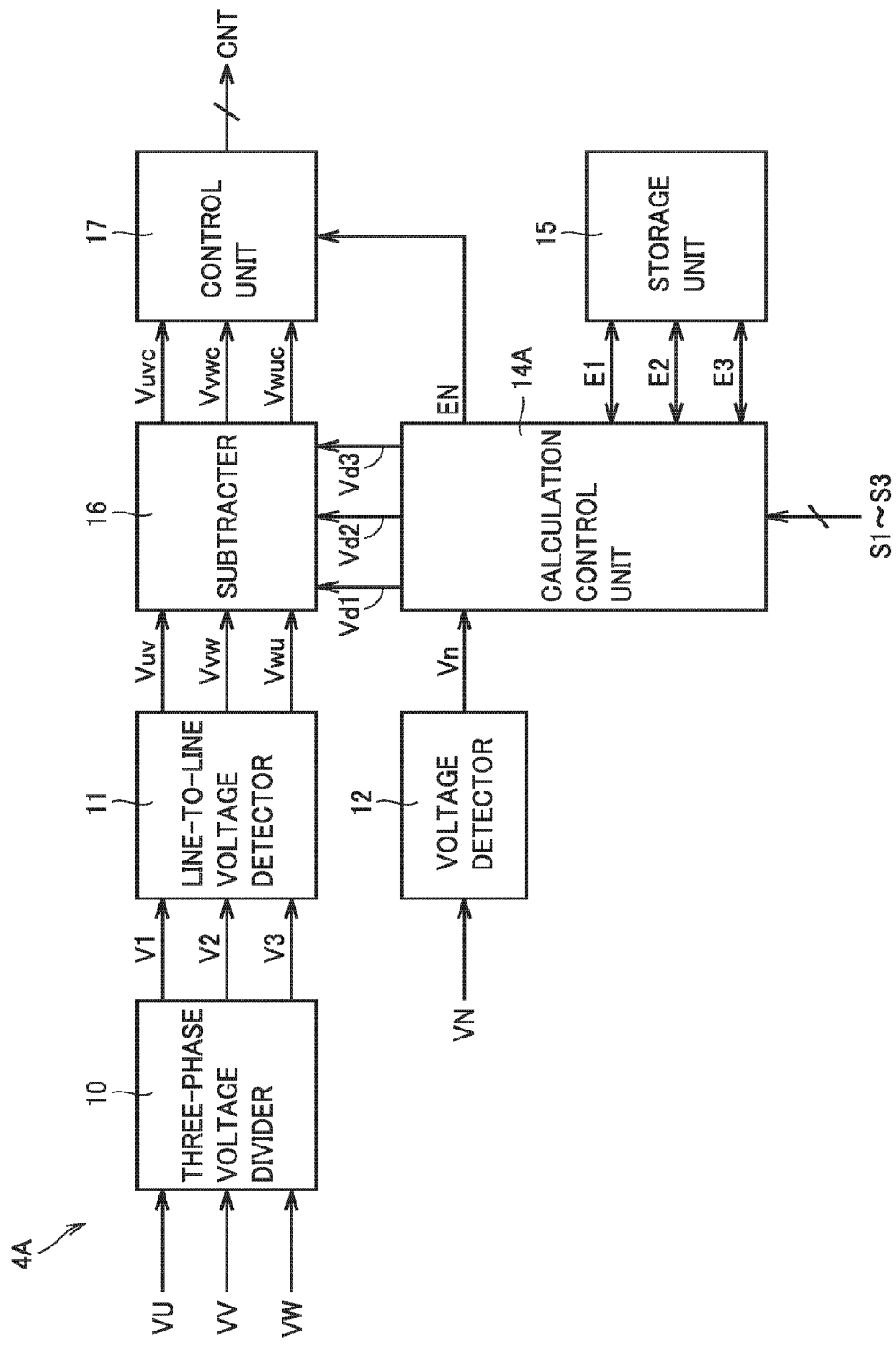
FIG. 7 is a block diagram showing the main part of a modification to the first embodiment.

FIG. 7 is a block diagram showing the main part of a power conversion device serving as a modification to the first embodiment, in comparison with FIG. 4. Referring to FIG. 7, this power conversion device differs from the power conversion device in the first embodiment in that control device 4 is replaced by a control device 4A. Control device 4A is formed by removing LPF 13 in control device 4 and replacing calculation control unit 14 by a calculation control unit 14A.

In this power conversion device, errors E1 to E3 of voltage division ratios A to C of voltage dividers 21 to 23 are obtained in advance and stored in storage unit 15. For example, resistances R1 to R6 of resistor elements 21a, 21b, 22a, 22b, 23a, and 23b included in voltage dividers 21 to 23 are detected, voltage division ratios A=R2/(R1+R2), B=R4/(R3+R4), and C=R6/(R5+R6) of voltage dividers 21 to 23 are obtained from the detected resistances R1 to R6, errors E1=A−B, E2=B−C, and E3=C−A are obtained from the obtained voltage division ratios A to C, and the obtained errors E1 to E3 are written into storage unit 15.

In this power conversion device, therefore, the error detection mode in which errors E1 to E3 of voltage division ratios A to C are detected and stored into storage unit 15 is not performed, and error detection signal S1 is not introduced. Calculation control unit 14A multiplies errors E1 to E3 of voltage division ratios A to C stored in storage unit 15 by neutral point voltage VN, obtains DC voltages Vd1 to Vd3 resulting from errors E1 to E3 of voltage division ratios A to C, and applies the obtained DC voltages Vd1 to Vd3 to subtracter 16. This modification achieves the same effect as in the first embodiment.

Second Embodiment

Figure 8:
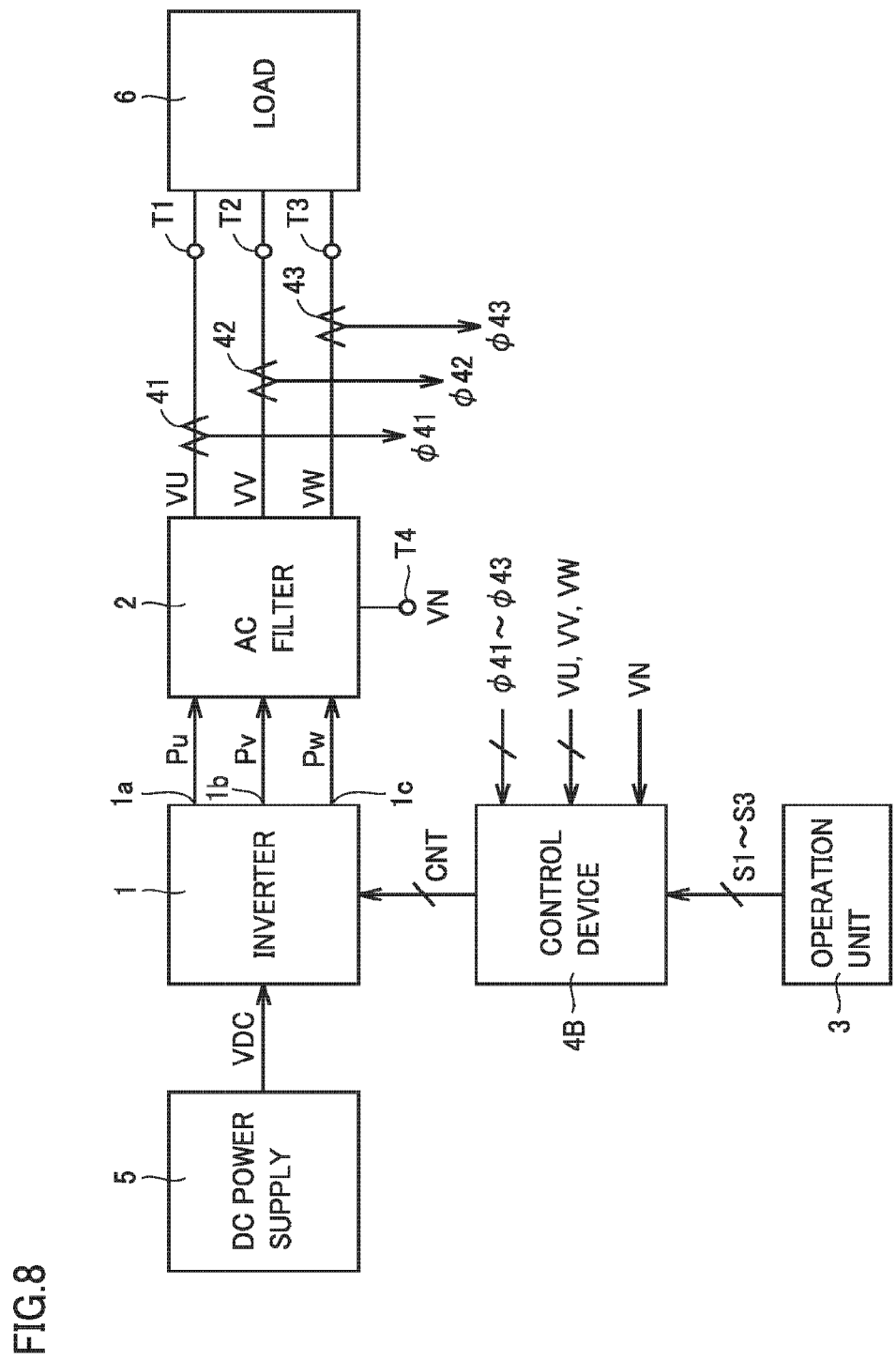
FIG. 8 is a block diagram showing a configuration of a power conversion device according to a second embodiment.

FIG. 8 is a block diagram showing a configuration of a power conversion device according to a second embodiment of the present invention, in comparison with FIG. 1. Referring to FIG. 8, this power conversion device differs from the power conversion device in the first embodiment in that current detectors 41 to 43 are added and control device 4 is replaced by a control device 4B.

Current detectors 41 to 43 are provided between AC filter 2 and output terminals T1 to T3, respectively, and detect three-phase AC currents IU, IV, and IW, respectively, flowing from AC filter 2 to load 6, and output signals φ41 to φ43 indicating the detected values to control device 4B.

Control device 4B generates and applies control signal CNT to inverter 1, based on signals S1 to S3 from operation unit 3, three-phase AC voltages VU, VV, and VW, neutral point voltage VN, and output signals φ41 to φ43 from current detectors 41 to 43.

Figure 9:
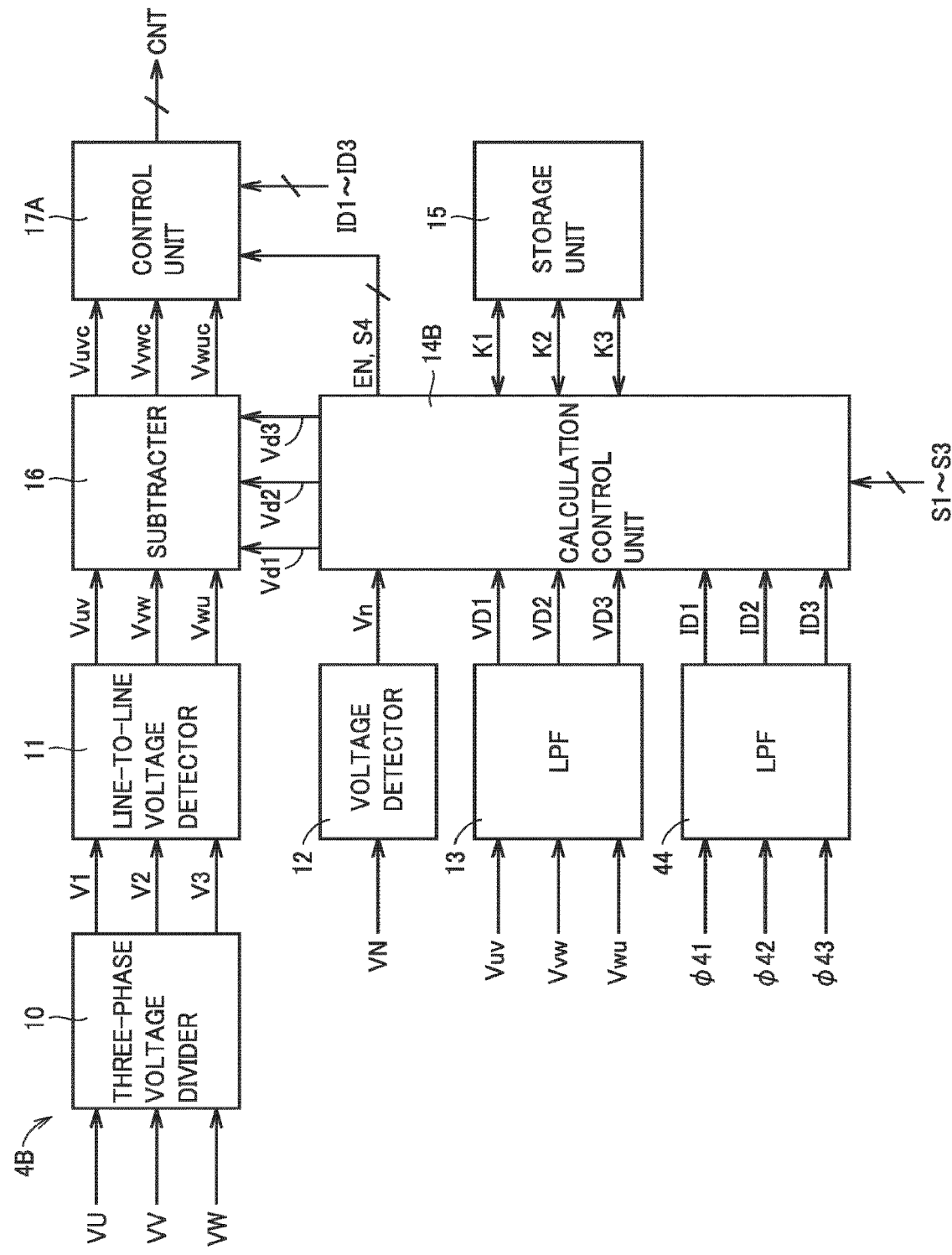
FIG. 9 is a block diagram showing a configuration of a control device shown in FIG. 8.

FIG. 9 is a block diagram showing a configuration of control device 4B, in comparison with FIG. 4. Referring to FIG. 9, control device 4B differs from control device 4 in that calculation control unit 14 and control unit 17 are replaced by a calculation control unit 14B and a control unit 17A, respectively, and an LPF 44 is added. LPF 44 (first DC detector) receives output signals φ41 to φ43 of current detectors 41 to 43 and allows DC components ID1 to ID3 of the received signals φ41 to φ43 to pass through calculation control unit 14B.

In the error detection mode in which information related to errors E1, E2, and E3 of voltage division ratios A, B, and C is detected, the user of the power conversion device connects load 6 to output terminals T1 to T3 (FIG. 1) and operates operation unit 3 (FIG. 1) to apply error detection signal S1 to calculation control unit 14B.

In response to error detection signal S1, first, calculation control unit 14 brings signal EN to "H" level that is the active level, activates control unit 17A to operate inverter 1. In this case, calculation control unit 14B does not output DC signals Vd1 to Vd3. Three-phase AC signals Vuv, Vvw, and Vwu therefore become three-phase AC signals Vuvc, Vvwc, and Vwuc as they are. Control unit 17A controls inverter 1 such that DC components VD1=VN×E1, VD2=VN×E2, and VD3=VN×E3 of three-phase AC signals Vuvc, Vvwc, and Vwuc are eliminated.

DC components ID1 to ID3 of output signals φ41 to φ43 of current detectors 41 to 43 are extracted by LPF 44 and applied to calculation control unit 14B. These DC components ID1 to ID3 result from controlling inverter 1 such that DC components VD1 to VD3 of three-phase AC signals Vuvc, Vvwc, and Vwuc (that is, three-phase AC signals Vuv, Vvw, and Vwu) are eliminated, and result from errors E1 to E3 of voltage division ratios A to C of voltage dividers 21 to 23.

The larger errors E1 to E3 are, the larger DC components ID1 to ID3 of three-phase AC signals φ41 to φ43 are. Errors E1 to E3 therefore can be represented by functions f1(ID1), f2(ID2), f3(ID3) of DC components ID1 to ID3.

When it is approximated that E1=K1×ID1, E2=K2×ID2, and E3=K3×ID3, K1=E1/ID1=VD1/(ID1×VN), K2=E2/ID2=VD2/(ID2×VN), and K3=E3/ID3=VD3/(ID3×VN) are obtained.

Calculation control unit 14B then outputs command signal S4 to control unit 17A. In response to command signal S4, control unit 17A controls inverter 1 such that DC components ID1 to ID3 of output signals φ41 to φ43 of current detectors 41 to 43 are reduced to a predetermined ratio (for example, 1/2). When DC components ID1 to ID3 of signals φ41 to φ43 are reduced, DC components VD1 to VD3 of three-phase AC signals Vuv, Vvw, and Vwu appear. DC components VD1 to VD3 are extracted by LPF 13 (second DC detector) and applied to calculation control unit 14B.

Neutral point voltage VN is detected by voltage detector 12, and signal Vn indicating neutral point voltage VN is applied to calculation control unit 14B. Calculation control unit 14B obtains coefficients K1 to K3, based on DC components VD1 to VD3, DC components ID1 to ID3, neutral point voltage VN, and the equations above, and stores these coefficients K1 to K3 into storage unit 15. After storing coefficients K1 to K3 into storage unit 15, calculation control unit 14B brings signal EN to "L" level that is the inactive level and inactivates control unit 17A to stop the operation of inverter 1. This enables the operation of load 6.

Figure 10:
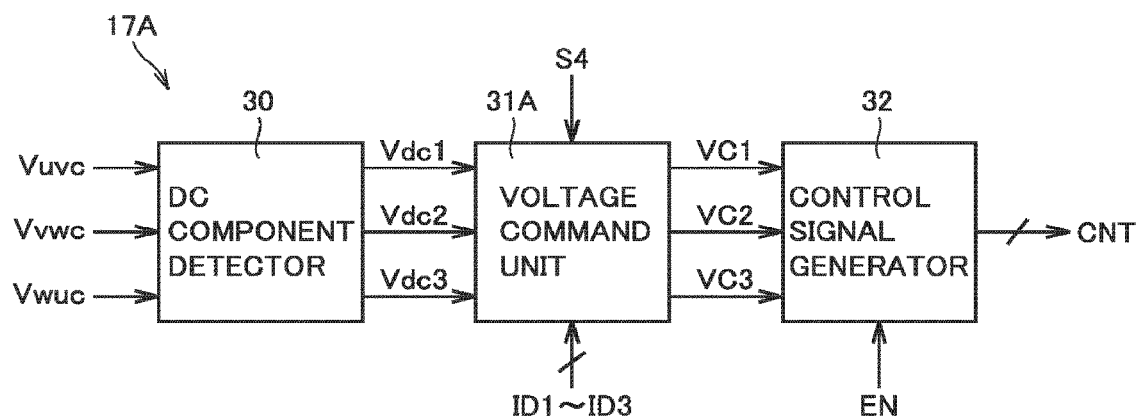
FIG. 10 is a block diagram showing a configuration of a control unit shown in FIG. 5.

FIG. 10 is a block diagram showing a configuration of control unit 17A, in comparison with FIG. 6. Referring to FIG. 10, control unit 17A differs from control unit 17 (FIG. 6) in that voltage command unit 31 is replaced by a voltage command unit 31A.

Voltage command unit 31A differs from voltage command unit 31 in that in response to command signal S4, it controls the waveforms of voltage command signals VC1, VC2, and VC3, respectively, such that DC components ID1 to ID3 of output signals φ41 to φ43 of current detectors 41 to 43 are reduced to a predetermined ratio (for example, 1/2). The other operation of control unit 17A is the same as control unit 17 and a description thereof is not repeated.

When load 6 is to be operated, the user of the power conversion device operates operation unit 3 (FIG. 1) to apply operation command signal S2 to calculation control unit 14B. Calculation control unit 14B brings signal EN to "H" level that is the active level and allows control unit 17A to operate inverter 1.

DC voltage VDC supplied from DC power supply 5 is converted by inverter 1 and AC filter 2 into three-phase AC voltages VU=Vu+VN, VV=Vv+VN, and VW=Vw+VN, which are supplied to load 6 to operate load 6. Three-phase AC voltages VU, VV, and VW are divided by voltage dividers 21 to 23 (FIG. 5).

Line-to-line voltages V12=V1−V2, V23=V2−V3, and V31=V3−V1 of three-phase AC voltages V1=(Vu+VN)A, V2=(Vv+VN)B, and V3=(Vw+VN)C generated by voltage dividers 21 to 23 are detected by voltage detectors 24 to 26, and three-phase AC signals Vuv, Vvw, and Vwu indicating line-to-line voltages V12, V23, and V31 are generated.

Neutral point voltage VN is detected by voltage detector 12, and signal Vn indicating neutral point voltage VN is applied to calculation control unit 14B. Calculation control unit 14B multiplies coefficients K1 to K3 stored in storage unit 15 (FIG. 4) by DC components ID1 to ID3 to obtain errors E1=K1×ID1, E2=K2×ID2, and E3=K3×ID3 of voltage division ratios A to C of voltage dividers 21 to 23. Further, calculation control unit 14B multiplies errors E1 to E3 by neutral point voltage VN to obtain DC voltages VD1 to VD3 (that is, DC signals Vd1 to Vd3) resulting from errors E1 to E3 of voltage division ratios A to C.

DC signals Vd1 to Vd3 applied from calculation control unit 14B are subtracted by subtracter 16 from three-phase AC signals Vuv, Vvw, and Vwu applied from line-to-line voltage detector 11, and three-phase AC signals Vuvc, Vvwc, and Vwuc are generated. Control unit 17A generates and applies control signal CNT to inverter 1 such that the DC components remaining in three-phase AC signals Vuvc, Vvwc, and Vwuc applied from subtracter 16 are eliminated, thereby preventing occurrence of an asymmetrical excitation phenomenon in three-phase transformer 7.

As described above, in this second embodiment, coefficients K1 to K3 are stored in storage unit 15, DC signals Vd1 to Vd3 resulting from errors E1 to E3 are obtained based on the stored coefficients K1 to K3, DC components ID1 to ID3 of three-phase AC signals φ41 to φ43, and neutral point voltage VN, three-phase AC signals Vuvc, Vvwc, and Vwuc are generated by removing DC signals Vd1 to Vd3 from three-phase AC signals Vuv, Vvw, and Vwu, and inverter 1 is controlled such that the DC components of three-phase AC signals Vuvc, Vvwc, and Vwuc are eliminated. Inverter 1 therefore can be controlled accurately even when voltage division ratios A to C of voltage dividers 21 to 23 are not identical.

In this second embodiment, E1=f1(ID1), E2=f2(ID2), and E3=f3(ID3) are approximated to E1=K1×ID1, E2=K2×ID2, and E3=K3×ID3, and coefficients K1, K2, and K3 are stored in storage unit 15. However, the present invention is not limited thereto and functions f1(ID1), f2(ID2), and f3(ID3) may be stored in storage unit 15. In this case, calculation control unit 14B obtains errors E1=f1(ID1), E2=f2(ID2), and E3=f3(ID3) of voltage division ratios A to C of voltage dividers 21 to 23, based on functions f1(ID1), f2(ID2), and f3(ID3) stored in storage unit 15 (FIG. 4) and DC components ID1 to ID3.

The embodiments disclosed here should be understood as being illustrative rather than being limitative in all respects. The present invention is shown not in the foregoing description but in the claims, and it is intended that all modifications that come within the meaning and range of equivalence to the claims are embraced here.

REFERENCE SIGNS LIST 1 inverter, 2 AC filter, 3 operation unit, 4, 4A, 4B control device, T1 to T3 output terminal, T4 neutral point terminal, 5 DC power supply, 6 load, L1 to L3 reactor, C1 to C3 capacitor, 7 three-phase transformer, T11 to T13 primary terminal, T14 to T16 secondary terminal, 7a to 7c primary winding, 7d to 7f secondary winding, 8 load body, 10 three-phase voltage divider, 11 line-to-line voltage detector, 12, 24 to 26 voltage detector, 13, 44 LPF, 14, 14A, 14B calculation control unit, 15 storage unit, 16 subtracter, 17, 17A control unit, 21 to 23 voltage divider, 21a to 23a, 21b to 23b resistor element, 21c to 23c monitor terminal, 30 DC component detector, 31, 31A voltage command unit, 32 control signal generator, 41 to 43 current detector.

The invention claimed is:

1. A power conversion device comprising:
a reverse converter that converts DC voltage into first three-phase AC voltages;
first to third voltage dividers that divide the first three-phase AC voltages to generate second three-phase AC voltages;
first to third voltage detectors that detect third three-phase AC voltages that are line-to-line voltages of the second three-phase AC voltages;
a fourth voltage detector that detects a neutral point voltage of the first three-phase AC voltages;
a storage unit in which information related to errors of voltage division ratios of the first to third voltage dividers is stored;
a correction unit that obtains first DC components resulting from the errors of voltage division ratios in the third three-phase AC voltages, based on detection results of the first to fourth voltage detectors and contents in the storage unit, and removes the obtained first DC components from the third three-phase AC voltages to generate fourth three-phase AC voltages; and
a control unit that controls the reverse converter such that second DC components of the fourth three-phase AC voltages are eliminated.

2. The power conversion device according to claim 1, wherein
the information stored in the storage unit includes a first error of voltage division ratios of the first and second voltage dividers, a second error of voltage division ratios of the second and third voltage dividers, and a third error of voltage division ratios of the third and first voltage dividers, and
the correction unit obtains the first DC components resulting from the errors of voltage division ratios in the third three-phase AC voltages by multiplying the neutral point voltage detected by the fourth voltage detector by the first to third errors stored in the storage unit.

3. The power conversion device according to claim 2, further comprising a DC detector that detects fourth DC components of the third three-phase AC voltages,
wherein the first to third errors are obtained by operating the reverse converter in a state in which a load is not connected to the reverse converter and dividing the fourth DC components of the third three-phase AC voltages detected by the DC detector by the neutral point voltage detected by the fourth voltage detector.

4. The power conversion device according to claim 1, wherein the first three-phase AC voltages are supplied to a load,
the power conversion device further comprises:
first to third current detectors that detect three-phase AC currents flowing from the reverse converter to the load; and
a first DC detector that detects fifth DC components of the three-phase AC currents detected by the first to third current detectors,
the information stored in the storage unit includes first to third coefficients, and
the correction unit obtains the first DC components resulting from the errors of voltage division ratios in the third three-phase AC voltages by multiplying the neutral point voltage detected by the fourth voltage detector by the first to third coefficients and further multiplying by the fifth DC components of the three-phase AC currents detected by the first DC detector.

5. The power conversion device according to claim 4, further comprising a second DC detector that detects fourth DC components of the third three-phase AC voltages, wherein the first to third coefficients are obtained by (i) controlling the reverse converter such that the DC components of the third three-phase AC voltages detected by the first to third voltage detectors are eliminated in a state in which a load is connected to the reverse converter, (ii) thereafter controlling the reverse converter such that the fifth DC components of the three-phase AC currents detected by the first DC detector are reduced, (iii) dividing the fourth DC components of the third three-phase AC voltages detected by the second DC detector by the fifth DC components of the three-phase AC currents detected by the first DC detector, and (iv) further dividing by the neutral point voltage detected by the fourth voltage detector.

6. The power conversion device according to claim 1, wherein the reverse converter includes
an inverter that converts the DC voltage into three-phase pulse signal trains, and
an AC filter that converts the three-phase pulse signal trains into the first three-phase AC voltages and outputs the first three-phase AC voltages to first to third output terminals,
the AC filter includes first to third reactors and first to third capacitors,
the first to third reactors have first terminals respectively receiving the three-phase pulse signal trains and have second terminals respectively connected to the first to third output terminals, and
the first to third capacitors have first electrodes respectively connected to the first to third output terminals and have second electrodes commonly receiving the neutral point voltage.

7. The power conversion device according to claim 1, wherein the first voltage divider includes first and second resistor elements,
the second voltage divider includes third and fourth resistor elements,
the third voltage divider includes fifth and sixth resistor elements,
the first, third, and fifth resistor elements have first terminals respectively connected to first to third output terminals of the reverse converter and have second terminals respectively connected to first to third monitor terminals,
the second, fourth, and sixth resistor elements have first terminals respectively connected to the first to third monitor terminals and have second terminals commonly receiving a reference voltage,
the first voltage detector detects a voltage between the first and second monitor terminals,
the second voltage detector detects a voltage between the second and third monitor terminals, and
the third voltage detector detects a voltage between the third and first monitor terminals.

8. The power conversion device according to claim 1, wherein the first three-phase AC voltages are supplied to a load,
the load includes
a load body and
a three-phase transformer that transmits the first three-phase AC voltages to the load body.

* * * * *